United States Patent
Li et al.

(10) Patent No.: US 12,430,301 B2
(45) Date of Patent: Sep. 30, 2025

(54) DATA MIGRATION METHOD AND DEVICE

(71) Applicant: Alibaba Group Holding Limited, Grand Cayman (KY)

(72) Inventors: Xin Li, Hangzhou (CN); Yue Pan, Hangzhou (CN); Haoran Zhang, Hangzhou (CN); Bowen Zheng, Hangzhou (CN); Feifei Li, Hangzhou (CN)

(73) Assignee: Alibaba Group Holding Limited, Grand Cayman (KI)

( * ) Notice: Subject to any disclaimer, the term of this patent is extended or adjusted under 35 U.S.C. 154(b) by 0 days.

(21) Appl. No.: 18/070,450

(22) Filed: Nov. 28, 2022

(65) Prior Publication Data

US 2023/0087447 A1 Mar. 23, 2023

Related U.S. Application Data

(63) Continuation of application No. PCT/CN2021/094094, filed on May 17, 2021.

(30) Foreign Application Priority Data

May 29, 2020 (CN) .......................... 202010477729.3

(51) Int. Cl.
  *G06F 16/21* (2019.01)
  *G06F 16/27* (2019.01)
(52) U.S. Cl.
  CPC .......... *G06F 16/214* (2019.01); *G06F 16/275* (2019.01)
(58) Field of Classification Search
  None
  See application file for complete search history.

(56) References Cited

U.S. PATENT DOCUMENTS

2010/0218033 A1\* 8/2010 Safari ..................... H04L 45/58
  709/248
2020/0104377 A1 4/2020 Earnesty, Jr. et al.
  (Continued)

FOREIGN PATENT DOCUMENTS

| CN | 105528368 A | | 4/2016 | |
|---|---|---|---|---|
| CN | 107391634 A | | 11/2017 | |
| CN | 109842636 A | \* | 6/2019 | .............. G06F 3/06 |

(Continued)

OTHER PUBLICATIONS

English Translation of International Search Report for corresponding PCT Application No. PCT/CN2021/094094, mailed on Aug. 18, 2021, 2 pages.

(Continued)

*Primary Examiner* — Amresh Singh
(74) *Attorney, Agent, or Firm* — Lee & Hayes, P.C.

(57) ABSTRACT

Embodiments of the present disclosure provide a data migration method and device, wherein the data migration method comprises: acquiring a migration request for a source database, creating a snapshot of to-be-migrated data in the source database and migrating the snapshot to a target database, reading a data migration log stored in a primary replica database of the source database and synchronizing the data migration log into the target database, and configuring a route for a target primary replica database of the target database according to routing rules of the primary replica database.

20 Claims, 5 Drawing Sheets

(56) References Cited

U.S. PATENT DOCUMENTS

2020/0301943 A1* 9/2020 Robinson ............ G06F 16/5846
2021/0099283 A1* 4/2021 Schvey .................. G06F 9/466

FOREIGN PATENT DOCUMENTS

| CN | 110502373 A | 11/2019 | |
|---|---|---|---|
| CN | 111813760 A | 10/2020 | |
| WO | WO-2018099397 A1 * | 6/2018 | .......... G06F 11/1451 |

OTHER PUBLICATIONS

English Translation of PCT Written Opinion for corresponding PCT application No. PCT/CN2021/094094, dated Aug. 18, 2021, 5 pages.
English Translation of Office Action for corresponding CN Application No. 202010477729.3 mailed on Jul. 25, 2023, 4 pages.
English Translation of Search Report for corresponding CN Application No. 202010477729.3 mailed on Jul. 25, 2023, 1page.

* cited by examiner

DATA MIGRATION METHOD AND DEVICE

CROSS REFERENCE TO RELATED APPLICATIONS

This application claims priority to and is a continuation of PCT Patent Application No. PCT/CN2021/094094, filed on 17 May 2021 and entitled "DATA MIGRATION METHOD AND DEVICE," which claims priority to Chinese Patent Application No. 202010477729.3, filed on 29 May 2020 and entitled "DATA MIGRATION METHOD AND DEVICE," which are incorporated herein by reference in their entirety.

TECHNICAL FIELD

The embodiments of the present disclosure relate to the technical field of databases, and, more particularly, to data migration methods. One or more embodiments of the present disclosure further relate to data migration apparatuses, computing device, and computer-readable storage medium.

BACKGROUND

With the development of science and technology, the Internet has been deeply involved in all aspects of social life, bringing great convenience to people's work, life, study, and the like. In Internet business operations, data traffic surges (a large increase in the database capacity requirement) or data traffic plummets (a decrease in the database capacity requirement) often occur in some specific time periods.

In order to meet elastic requirements, it is generally necessary for a distributed database to have the linear capability of scale-in/scale-out of nodes. In the process of scaling, in order to balance the storage and computing loads, data migration needs to be performed between nodes, and the efficiency of data migration affects the availability and performance of a system during linear scaling. For example, if a communication link is used to directly transmit data blocks, the sizes of their data fragments are limited due to the short delay required by the communication link, leading to a lack of flexibility; or, synchronization and communication links may be blocked when a data set is large, affecting the efficiency of data synchronization. Therefore, there is an urgent need for a data migration method to overcome such problems.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The embodiments of the present disclosure provide data migration methods. One or more embodiments of the present disclosure further relate to data migration devices, computing device, and computer-readable storage medium, so as to solve the technical defects existing in the conventional techniques.

According to an embodiment of the present disclosure, a data migration method is provided, comprising:
acquiring a migration request for a source database;
creating a snapshot of to-be-migrated data in the source database and migrating the snapshot to a target database;
reading a data migration log stored in a primary replica database of the source database and synchronizing the data migration log into the target database; and
configuring a route for a target primary replica database of the target database according to routing rules of the primary replica database.

For example, the source database includes the primary replica database and at least one secondary replica database; and the target database includes at least two replica databases.

For example, the data migration log is synchronized into the target database by:
establishing a log synchronization link based on the primary replica database, the at least one secondary replica database, and the at least two replica databases; and
synchronizing the data migration log into the target database according to an upstream-downstream connection relationship of each node in the log synchronization link.

For example, the synchronizing the data migration log into the target database according to an upstream-downstream connection relationship of each node in the log synchronization link comprises:
synchronizing the data migration log from the primary replica database into the at least one secondary replica database; and
synchronizing the data migration log from the at least one secondary replica database into the at least two replica databases.

For example, the configuring a route for a target primary replica database of the target database according to routing rules of the primary replica database comprises:
determining any of the replica databases contained in the target database as the target primary replica database; and
configuring a route for the target primary replica database according to the routing rules of the primary replica database.

For example, the target primary replica database is determined by:
initiating an election to the source database based on identification information of the at least two replica databases, wherein the election is used to elect the target primary replica database from the at least two replica databases;
acquiring voting results submitted by the primary replica database and the at least one secondary replica database; and
counting the voting results, and determining one of the at least two replica databases first obtaining more votes than a preset threshold as the target primary replica database.

For example, the creating a snapshot of to-be-migrated data in the source database and migrating the snapshot to a target database comprises:
creating a snapshot of full to-be-migrated data in the primary replica database or any secondary replica database of the source database; and
migrating the snapshot to the target database by a preset migration mode.

For example, it further comprises, after the step of reading a data migration log stored in a primary replica database of the source database and synchronizing the data migration log into the target database is performed and before the step of configuring a route for a target primary replica database of the target database according to routing rules of the primary replica database is performed:

judging whether the number of synchronized log entries in the data migration log meets a preset threshold; and if so, determining that a synchronization progress of the data migration log meets a preset progress threshold, and performing the step of configuring the route for the target primary replica database of the target database according to the routing rules of the primary replica database in the source database.

For example, the method further comprises, after the step of configuring a route for a target primary replica database of the target database according to routing rules of the primary replica database in the source database is performed:

receiving a data read-write request;

searching a corresponding target primary replica database according to an identifier of requested data in the data read request; and performing a data read-write operation on the target primary replica database according to routing rules for data read-write of the target primary replica database.

According to an embodiment of the present disclosure, a data migration device is provided, comprising:

an acquisition module, configured to acquire a migration request for a source database;

a creation module, configured to create a snapshot of to-be-migrated data in the source database and migrate the snapshot to a target database;

a reading module, configured to read a data migration log stored in a primary replica database of the source database and synchronize the data migration log into the target database; and a configuration module, configured to configure a route for a target primary replica database of the target database according to routing rules of the primary replica database.

According to an embodiment of the present disclosure, a computing device is provided, comprising:

a memory and a processor;

wherein the memory is configured to store computer-executable instructions, and the processor is configured to execute the computer-executable instructions to:

acquire a migration request for a source database;

create a snapshot of to-be-migrated data in the source database and migrate the snapshot to a target database;

read a data migration log stored in a primary replica database of the source database and synchronize the data migration log into the target database; and configure a route for a target primary replica database of the target database according to routing rules of the primary replica database.

According to an embodiment of the present disclosure, a computer-readable storage medium having computer-executable instructions stored thereon, which, when executed by a processor, implement the steps of the data migration method is provided.

In one embodiment of the present disclosure, a method includes acquiring a migration request for a source database, creating a snapshot of to-be-migrated data in the source database and migrating the snapshot to a target database, reading a data migration log stored in a primary replica database of the source database and synchronizing the data migration log into the target database, and configuring a route for a target primary replica database of the target database according to routing rules of the primary replica database.

By using the techniques of the present disclosure, to-be-migrated data in the source database are fully migrated to the target database through snapshot export, and in addition, the data migration log is synchronized in an incremental synchronization manner and route switching is performed in the log synchronization process, which, on the one hand, avoids blocking a synchronization link for incremental synchronization and thus advantageously improves the efficiency of log synchronization, and on the other hand, allows for normal data read-write in the full migration process as no routing switching is performed in the full migration process and thus advantageously improves data read-write.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description are merely some embodiments of the present disclosure, and those of ordinary skills in the art may further derive other accompanying drawings from these accompanying drawings without inventive efforts.

DESCRIPTION OF EMBODIMENTS

In the following description, many specific details are explained in order for those skilled in the art to fully understand the present disclosure. However, the present disclosure can be implemented in many other manners different from those described herein. Those skilled in the art may make similar generalization without departing from the spirit of the present disclosure. Therefore, the present disclosure is not limited by the specific implementations disclosed below.

The terms used in one or more embodiments of the present disclosure are only for the purpose of describing specific embodiments, and are not intended to limit one or more embodiments of the present disclosure. Unless the context clearly dictates otherwise, the singular forms "a," "said," and "the" used in one or more embodiments of the present disclosure and the appended claims are also intended to include the plural forms. It should also be appreciated that the term "and/or" used in one or more embodiments of the present disclosure refers to and includes any or all possible combinations of one or more associated listed items.

It should be appreciated that, although the terms "first," "second," and the like may be used to describe various information in one or more embodiments of the present disclosure, such information should not be limited to these terms. These terms are only used to distinguish the same type of information from each other. For example, without departing from the scope of one or more embodiments of the present disclosure, "first" may also be referred to as "second." Similarly, "second" may also be referred to as "first." Depending on the context, the word "if" as used herein may be interpreted as "when" or "in the case that" or "in response to a determination."

First, the terms involved in one or more embodiments of the present disclosure are explained below.

Raft algorithm: a consensus algorithm that provides a general method for distributing state machines in a cluster of computing systems so as to ensure that each node in the cluster can achieve the same state transitions.

Data mirroring backup tool: an efficient tool for data transfer and file synchronization, which is written in C language, and widely integrated and used in Unix-like operating systems.

In the present disclosure, a data migration method is provided, and the present disclosure further relates to a data migration device, a computing device, and a computer-readable storage medium, as described in further detail one by one in the following embodiments.

Figure 1:
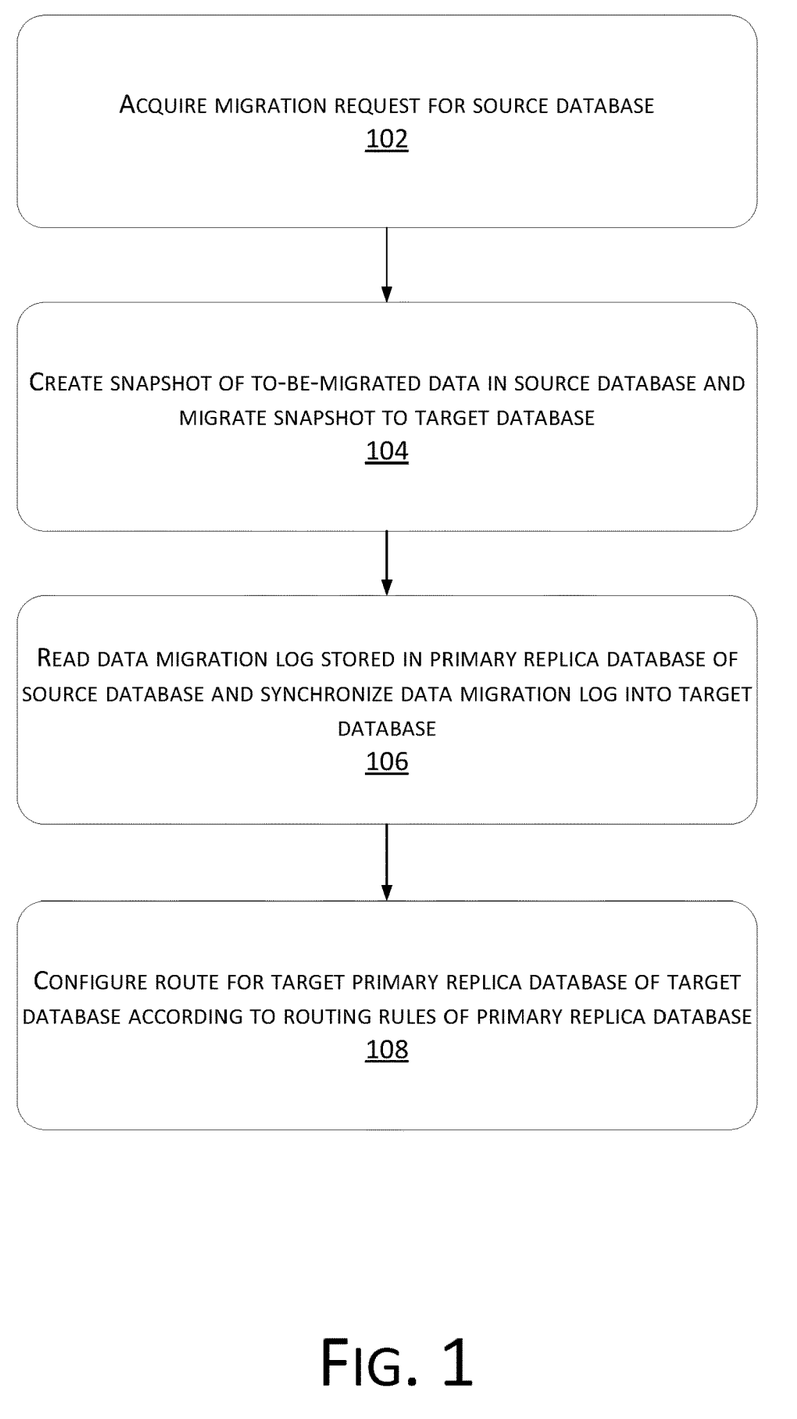
FIG. 1 is a processing flowchart of a data migration method according to an embodiment of the present disclosure.

FIG. 1 shows a processing flowchart of a data migration method according to an embodiment of the present disclosure, including steps 102-108.

Step 102, acquiring a migration request for a source database.

With the development of science and technology, the Internet has been deeply involved in all aspects of social life, bringing great convenience to people's work, life, study, and the like. In Internet business operations, data traffic surges (a large increase in the database capacity requirement) or data traffic plummets (a decrease in the database capacity requirement) often occur in some specific time periods.

In order to meet elastic requirements, it is generally necessary for a distributed database to have the linear capability of scale-in/scale-out of nodes. In the process of scaling, in order to balance the storage and computing loads, data migration needs to be performed between nodes, and the efficiency of data migration affects the availability and performance of a system during linear scaling.

Based on this, the data migration method according to the embodiments of the present disclosure is applied to a distributed database system, to-be-migrated data in a source database are fully migrated to a target database through snapshot export, and in addition, the data migration log is synchronized in an incremental synchronization manner and route switching is performed in the log synchronization process, which, on the one hand, avoids blocking a synchronization link for incremental synchronization and thus advantageously improves the efficiency of log synchronization, and on the other hand, allows for normal data read-write in the full migration process because no routing switching is performed in the full migration process and thus advantageously improves data read-write.

In order to ensure high availability of the distributed database system during linear scaling, the data migration method according to the embodiments of the present disclosure adopts a full-incremental data migration manner, such that the system availability is not affected throughout the migration process or the routing switching process.

In particular, the data migration refers to migrating the data in the source database to the target database, wherein the source database includes the primary replica database and at least one secondary replica database, and the target database includes at least two replica databases; and after acquiring a migration request for the source database, a snapshot of the full data in the source database can be created, and the data in the source database can be fully migrated to the target database in a snapshot migration manner.

Step 104, creating a snapshot of to-be-migrated data in the source database and migrating the snapshot to a target database.

In particular, since the source database comprises one primary replica database and at least one secondary replica database, in specific implementations, creating a snapshot of to-be-migrated data in the source database and migrating the snapshot to a target database after acquiring a migration request for the source database refers to creating a snapshot of the full data to be migrated in the primary replica database or any secondary replica database of the source database and migrating the snapshot to the target database by a preset migration mode.

Further, since the data stored in the primary replica database and the at least one secondary replica database of the source database are the same, in the data migration process, only the data in any one of the primary replica database or the at least one secondary replica database of the source database need to be synchronized. Therefore, creating a snapshot of to-be-migrated data in the source database refers to creating a snapshot of full to-be-migrated data in the primary replica database or any secondary replica database of the source database. After the snapshot is created, the snapshot is migrated in parallel to the at least two replica databases of the target database by the preset migration mode. In specific implementations, the preset migration method may be adopting a data mirroring backup tool (rsync tool), that is, the rsync tool is adopted to perform full data migration.

Before the data migration is completed, the data reading and writing functions are provided by the source database. Therefore, before switching the route from the source database to the target database, the primary replica database and the at least one secondary replica database of the source database have an active state (active to handle data read-write requests), while the at least two replica databases of the target database have a passive state (idle state) and are in preparation for changing their states to active.

Step 106, reading a data migration log stored in a primary replica database of the source database and synchronizing the data migration log into the target database.

In particular, the data migration log is a file separated from the database file. The data migration log stores all changes made to the database, and records all insertions, updates, deletions, submissions, rollbacks, and database schema changes. The data migration log is a key component for data/file backup and recovery, so the data migration log needs to be incrementally migrated to (synchronized into) the target database after the data in the source database are fully migrated to the target database.

In specific implementations, the raft algorithm can be adopted to synchronize the data migration log. The raft algorithm divides roles in the distributed database system into leaders (leader nodes), followers (follower nodes), and candidates (candidate nodes). In the embodiments of the present disclosure, the primary replica database included in the source database is a leader node, and the at least one secondary replica database included in the source database is a follower node. Since there is no target primary replica database in the target database before the data migration log is synchronized into the target database, the at least two replica databases included in the target database are in a passive state before the data migration log is synchronized into the target database, and the at least two replica databases of the target database change their states from passive to active after the data migration log is synchronized into the target database. Then, the at least two replica databases can be used as targets to which the leader node can switch (that is, the at least two replica databases can be used as candidate nodes).

In the raft algorithm, the leader node is used to receive a data read-write request sent by a client and synchronize the data migration log into the follower nodes, and when the data migration log is synchronized into a majority of nodes, the leader node can send the follower nodes prompt information for log submission; the follower nodes are used to receive and persist the data migration log synchronized by the leader node, and submit the log after receiving the prompt information for log submission sent by the leader node; and the candidate nodes are temporary roles in the process for electing a leader node.

The states of the leader node and follower nodes in the source database are active, and the states of the at least two replica databases of the target database are passive. The at least two replica databases included in the target database are in a passive state before the data migration log is synchronized into the target database, and once the at least two replica databases of the target database change their states from passive to active after the data migration log is synchronized into the target database, the at least two replica databases can be used as candidate nodes. The leader node and follower nodes in the source database are used to make an election for the at least two replica databases of the target database when the log synchronization progress meets a preset threshold, that is, to elect the target primary replica database in the candidate nodes.

In practical applications, the synchronization mechanism of raft-log can be used to synchronize the data migration log. Since there can only be at most one leader node in the raft distributed database system, the log can only be copied from the leader node to the follower nodes. An application scenario of the raft algorithm is a replicated state machine, in which a client (participant) sends commands to be executed on the state machine to the replicated state machine, and the raft algorithm is responsible for copying the commands to other state machines in the form of logs. If different state machines execute these commands in a consistent order, the same output results can be obtained. Therefore, a consensus algorithm can be used to ensure that the contents and orders of the synchronized data migration logs are consistent.

In specific implementations, a log synchronization link can be used to synchronize the data migration log, and therefore, a log synchronization link needs to be established before synchronizing the log, and the log is synchronized into the target database through the log synchronization link, which can be particularly implemented by:
 establishing a log synchronization link based on the primary replica database, the at least one secondary replica database, and the at least two replica databases; and
 synchronizing the data migration log into the target database according to an upstream-downstream connection relationship of each node in the log synchronization link.

Further, synchronizing the data migration log into the target database according to an upstream-downstream connection relationship of each node in the log synchronization link can be particularly implemented by:
 synchronizing the data migration log from the primary replica database into the at least one secondary replica database; and
 synchronizing the data migration log from the at least one secondary replica database into the at least two replica databases.

In particular, the data migration log is a file separated from the database file. The data migration log stores all changes made to the database, and records all insertions, updates, deletions, submissions and rollbacks performed on data in the database, and database schema changes. The data migration log is a key component for data/file backup and recovery, and the log is stored in the leader node. The leader node synchronizes the log into the follower nodes, and the follower nodes synchronize the log into the at least two replica databases of the target database. Therefore, a log synchronization link needs to be established before synchronizing the data migration log based on the primary replica database, the at least one secondary replica database, the at least two replica databases, and a synchronization order of the data migration log among various nodes, and after the log synchronization link is established, the data migration log can be synchronized into the target database according to an upstream-downstream connection relationship of each node in the link.

Step 108, configuring a route for a target primary replica database of the target database according to routing rules of the primary replica database.

In particular, since the data migration log includes log entries with sequential log indexes, the synchronization of the data migration log is actually the synchronization of each log entry in the log. If the number of synchronized log entries meets a preset threshold, a route can be configured for the replica databases of the target database, that is, the route of the primary replica database in the source database is switched to the target primary replica database of the target database, and the route can provide data reading and writing functions.

In specific implementations, since the data migration log includes log entries, the synchronization progress of the data migration log can be determined by:
 judging whether the number of synchronized log entries in the data migration log meets a preset threshold; and
 if so, determining that the synchronization progress of the data migration log meets a preset progress threshold, and configuring the route for the target primary replica database of the target database according to the routing rules of the primary replica database in the source database.

In particular, since the synchronization of the data migration log is actually the synchronization of each log entry in the log, the process of judging whether the number of synchronized log entries in the data migration log meets a preset threshold can be performed simultaneously with the process of synchronizing the data migration log into the target database. If the number of synchronized log entries is judged to meet the preset threshold, route switching can be performed in the log synchronization process, that is, the route can be switched from the source database to the target database; and if the number of synchronized log entries is judged not to meet the preset threshold, the log synchronization process can continue.

The client initiating three writing requests is taken as an example, after receiving these requests, the leader node first synchronizes the requests into the follower nodes in batches in the form of logs, then updates log sites after receiving the follower nodes' response indicating a successful log replication, and finally adds the instructions sent by the client to a counter through invoking an interface to execute a counting operation in the requests.

Updating log sites indicates that the logs before the log sites (inclusive) have all been copied to more than half of the nodes in the system. If the site is the position of "2," it indicates that the logs of "0-2" have all been copied to more than half of the nodes. If the leader continues to copy the two logs "3" and "4" to the follower nodes in batches, then the site slides to the position of "4," indicating that the logs of "0-4" have all been copied to more than half of the nodes.

When the difference between log sites of at least one replica database in a target database and log sites of a primary replica database in a source database is less than a preset threshold (100), a leader node in the source database initiates a member change operation, that is, the state of at least one secondary replica database in the source database is switched from active to passive, the states of at least two replica databases in the target database are switched from passive to active, and the roles of the at least two replica databases are changed to follower nodes.

In addition, the target primary replica database of the target database can be determined through election, which can be particularly implemented by:
 initiating an election to the source database based on identification information of the at least two replica databases, wherein the election is used to elect the target primary replica database from the at least two replica databases;
 acquiring voting results submitted by the primary replica database and the at least one secondary replica database; and
 counting the voting results, and determining one of the at least two replica databases first obtaining more votes than a preset threshold as the target primary replica database.

In particular, the counting of the voting results is dynamically performed along with the voting process. The primary replica database and the at least one secondary replica database in the source database vote on the at least two replica databases in the target database, and the target primary replica database in the target database is determined according to the voting results, that is, in the voting process, the number of votes of the at least two replica databases in the target database are dynamically counted, and the replica database in the at least two replica databases first obtaining more votes than the preset threshold is determined as the target primary replica database.

In practical applications, raft triggers a leader election through heartbeats, initializes the roles of the at least two replica databases in the target database as follower nodes, appoints the primary replica database and the at least one secondary replica database in the source database as voting members to vote on the follower nodes in the target database, and generates the target primary replica database in the target database.

After the voting results are acquired from the voting members, the voting results are counted, and the follower node in the target database first obtaining more votes than a preset threshold is determined as a leader node. In practical applications, the preset threshold can be determined according to the number of replica databases in the source database, for example, if the source database includes 3 replica databases (1 primary replica database and 2 secondary replica databases), the preset threshold can be set to 2 (the voting rate is greater than 50%), and the follower node in the target database first obtaining more than 2 votes is determined as the leader node.

The voting can be based on the synchronization progress of the data migration log in each node, that is, a follower node with the most synchronized log entries has a higher probability of changing to a leader node.

In addition, since the leader node is used to receive data read-write requests from the client, after the route is switched to the target primary replica database (leader node) in the target database, the target primary replica database can be used to receive data read-write requests from the client, and the process of handling the data read-write requests can be particularly implemented by:
 receiving a data read-write request;
 searching a corresponding target primary replica database according to an identifier of requested data in the data read request; and
 performing a data read-write operation on the target primary replica database according to routing rules for data read-write of the target primary replica database.

In particular, after configuring the route for the target primary replica database of the target database, the target primary replica database (leader node) can provide data reading and writing services, and the leader node adds the requests to its log in the form of log entries, and then synchronizes the log entries in parallel into other follower nodes. When this log is synchronized into a majority of follower nodes, the leader node applies this log to its state machine and returns the execution result to the client.

Figure 2:
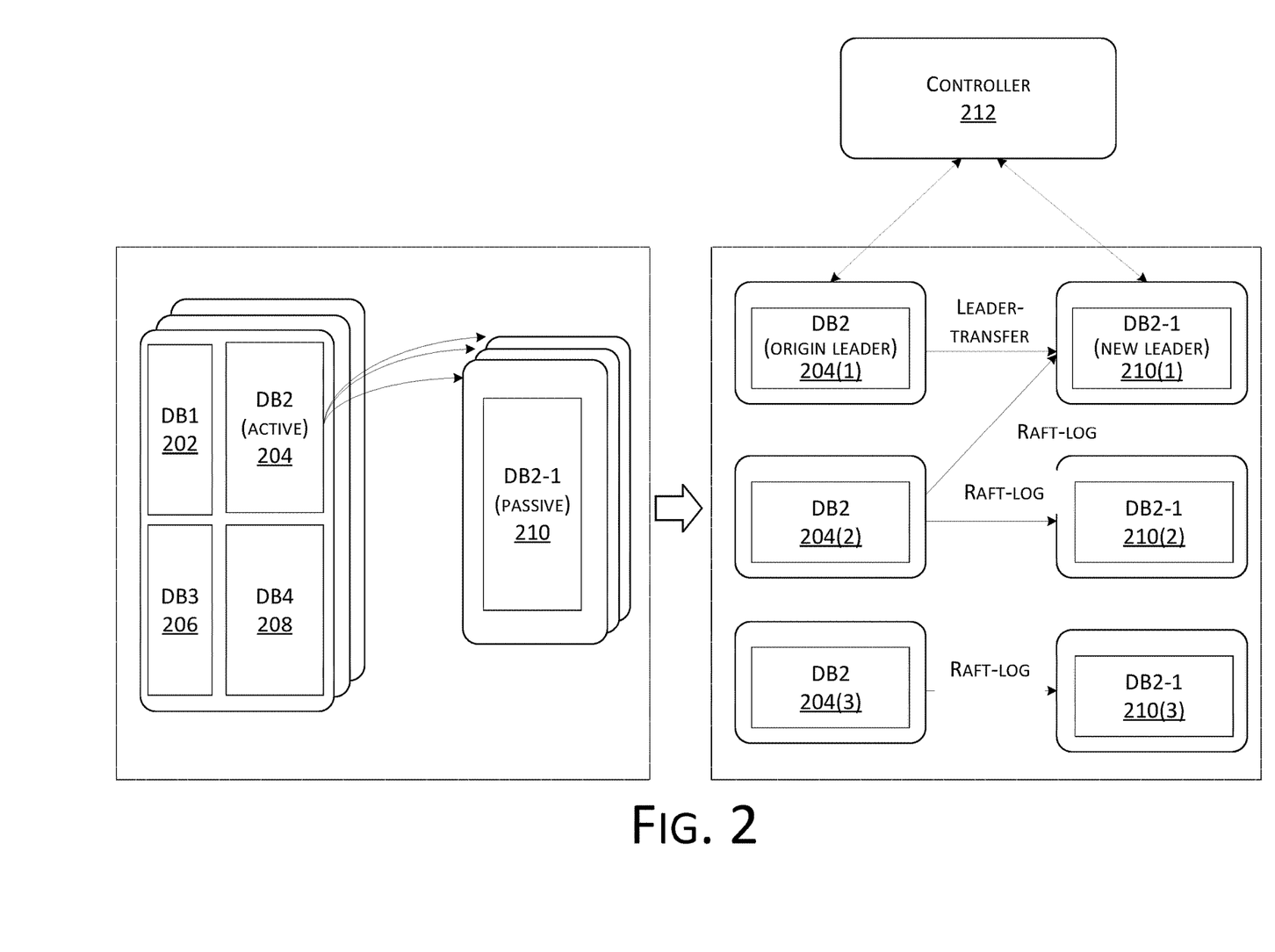
FIG. 2 is a schematic diagram of a database expansion process according to an embodiment of the present disclosure.

In particular, the embodiments of the present disclosure are described by taking the source database including 3 replica databases as an example. The schematic diagram of the expansion process of the distributed database system is shown in FIG. 2. The distributed database system shown in FIG. 2 includes four source databases, namely, DB1 202, DB2 204, DB3 206, and DB4 208, and the data migration process of DB2 204 is taken as an example for schematic illustration. The data migration process of DB1 202, DB3 206, and DB4 208 is similar to the data migration process of DB2 204, and will not be repeated here.

In FIG. 2, both the source database DB2 204 and the target database DB2-1 210 contain 3 replica databases. The 3 replica databases of the source database DB2 204 are DB2 204(1), DB2 204(2), and DB2 204(3). The 3 replica databases of the target database DB2-1 210 are DB2-1 210(1), DB2-1 210(2), and DB2-1 210(3).

Before the routing configuration is performed on the target database DB2-1 210, one replica database in the source database DB2 204 is the primary replica database (leader node) 204(1), and the remaining two replica databases DB2 204(2) and DB2 204(3) are secondary replica databases (follower nodes). After a data migration request for the source database DB2 204 is acquired, a snapshot of full to-be-migrated data in the primary replica database or any secondary replica database is created, and the snapshot is migrated in parallel to 3 replica databases DB2-1 210(1), DB2-1 210(2), DB2-1 210(3) of the target database DB2-1 210 by adopting the data mirroring backup tool such as the rsync tool; after the migration is completed, the data slice raft has 6 replica databases, wherein the 3 replica databases 204(1), 204(2), 204(3) in the source database 204 are still in an active state, and the 3 replicas 210(1), 210(2), 210(3) in the target database 210 are in a passive state; the data migration log of the leader node 204(1) in the source database 204 is read, and the data migration log is incrementally migrated to the target database 210. Incremental migration uses the synchronization mechanism of raft-log. The data migration log is synchronized from the replica database of the source database into the target database through the log synchronization link. When the log site of any replica database in the target database is close to the site of the primary replica database (leader node) 204(1) of the source database 204 (the difference between the sites is less than a preset threshold such as 100), the leader node 204(1) initiates a member change operation, and the state of the other 2 follower nodes 204(2) and 204(3) in the source databases 204 is switched from active to passive, the state of the 3 replica databases 210(1), 210(2), and 210(3) of the target database 210 is switched from passive to active, and the roles of the 3 replica databases 210(1), 210(2), and 210(3) are switched to follower nodes.

After the state of each replica database in the source database 204 and the target database 210 is changed, the leader node initiates an election to the source database 204 based on identification information of any replica database (follower node) in the target database 210, and the any replica database is determined as the target primary replica database. That is, the primary replica database in the source database 204 actively migrates the leader to any replica database, such as 210(1) in the target database 210, and such replica database is changed from a follower node to a leader node after the migration.

After the target primary replica database (new leader node) 210(1) is determined among the 3 follower nodes, routing configuration is performed on the target primary replica database according to the routing rules of the leader node in the source database.

The controller 212 is used to manage read-write routing, that is, it is used to determine which node the fragmented data to be read/written falls on. The controller 212 is used to receive data read-write requests. After a read-write request is sent to the controller 212, the controller 212 allocates read-write tasks, and therefore, so as long as the read-write routing information is stored on the controller 212, the controller 212 can find the replica database related to the read-write requests. Therefore, when the route is switched, the new leader node 210(1) immediately initiates a heartbeat to inform the controller 212 of the result of the route switching, based on which the controller 212 updates its own routing information.

In one embodiment of the present disclosure, by acquiring a migration request for performing data migration on a source database, creating a snapshot of to-be-migrated data in the source database and migrating the snapshot to a target database, reading a data migration log stored in a primary replica database of the source database and synchronizing the data migration log into the target database, and configuring a route for a target primary replica database of the target database according to routing rules of the primary replica database when the synchronization progress of the data migration log meets a preset progress threshold, the data in the source database are fully migrated to the target database through snapshot export, and in addition, the data migration log is synchronized in an incremental synchronization manner and route switching is performed in the log synchronization process, which, on the one hand, avoids blocking a synchronization link for incremental synchronization and thus advantageously improves the efficiency of log synchronization, and on the other hand, allows for normal data read-write in the full migration process because no routing switching is performed in the full migration process and thus advantageously improves data read-write.

Figure 3:
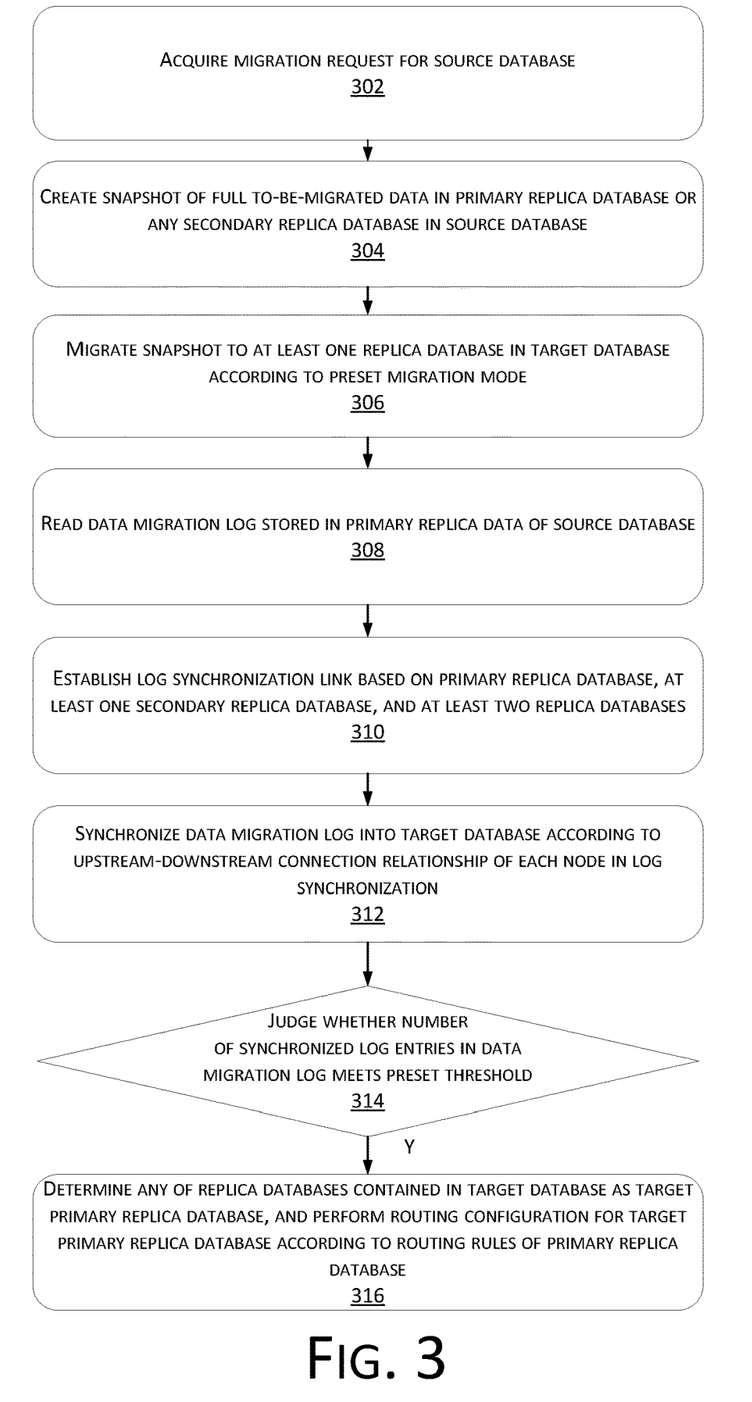
FIG. 3 is a flowchart of a processing process of a data migration method according to an embodiment of the present disclosure.

The data migration method will be further described below by taking the application of the data migration method provided in the present disclosure as an example in conjunction with FIG. 3. FIG. 3 shows a flowchart of a processing process of a data migration method according to an embodiment of the present disclosure, specifically including steps 302-316.

Step 302, acquiring a migration request for a source database.

Step 304, creating a snapshot of full to-be-migrated data in the primary replica database or any secondary replica database in the source database.

Step 306, migrating the snapshot to at least one replica database in the target database according to a preset migration mode.

Step 308, reading a data migration log stored in the primary replica data of the source database.

Step 310, establishing a log synchronization link based on the primary replica database, the at least one secondary replica database, and the at least two replica databases.

Step 312, synchronizing the data migration log into the target database according to an upstream-downstream connection relationship of each node in the log synchronization link.

In particular, the data migration log is synchronized from the primary replica database into the at least one secondary replica database, and the data migration log is synchronized from the at least one secondary replica database into the at least two replica databases.

Step 314, judging whether the number of synchronized log entries in the data migration log meets a preset threshold; if so, performing step 316.

In particular, if it is judged that the number of the synchronized log entries in the data migration log does not meet the preset threshold, the log synchronization is continued; if it is judged that the number of the synchronized log entries in the data migration log meets the preset threshold, route switching can be performed simultaneously with the log synchronization, that is, the read-write routing of the primary replica database in the source database is switched to the target primary replica database of the target database.

Step 316, determining any of the replica databases contained in the target database as the target primary replica database, and performing routing configuration for the target primary replica database according to the routing rules of the primary replica database.

In the embodiments of the present disclosure, the data in the source database are fully migrated to the target database through snapshot export, and in addition, the data migration log is synchronized in an incremental synchronization manner and route switching is performed in the log synchronization process, which, on the one hand, avoids blocking a synchronization link for incremental synchronization and thus advantageously improves the efficiency of log synchronization, and on the other hand, allows for normal data read-write in the full migration process because no routing switching is performed in the full migration process and thus advantageously improves data read-write.

Figure 4:
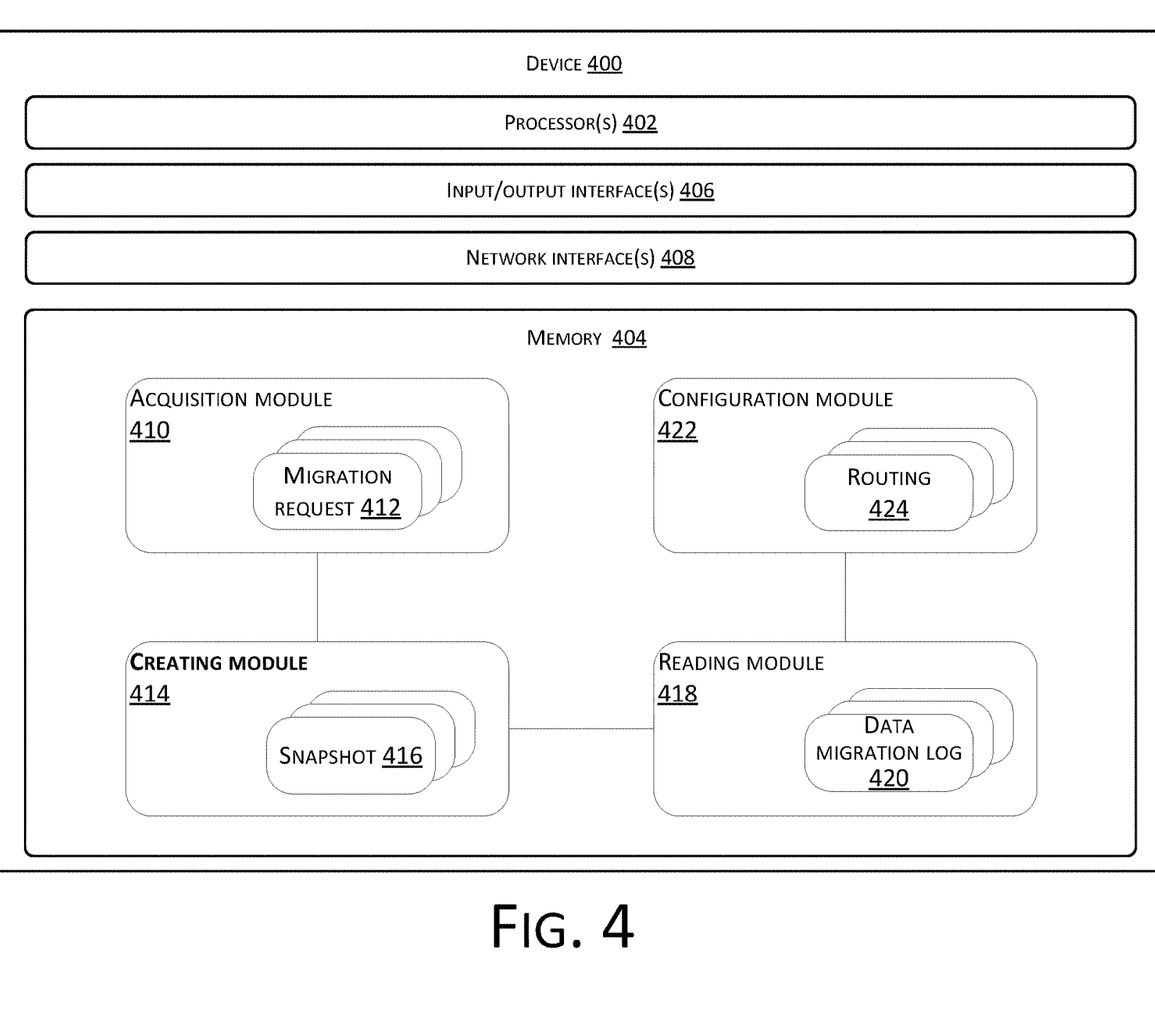
FIG. 4 is a schematic diagram of a data migration device according to an embodiment of the present disclosure.

Corresponding to the method embodiments, the present disclosure further provides an embodiment of a data migration device, and FIG. 4 shows a schematic diagram of a data migration device according to an embodiment of the present disclosure. As shown in FIG. 4, the device 400 includes one or more processor(s) 402 or data processing unit(s) and memory 404. The device 400 may further include one or more input/output interface(s) 406 and one or more network interface(s) 408. The memory 404 is an example of computer-readable media.

Computer-readable media further include non-volatile and volatile, removable and non-removable media employing any method or technique to achieve information storage. The information may be computer-readable instructions, data structures, modules of programs, or other data. Examples of computer storage media include, but are not limited to, a phase-change random access memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disc read-only memory (CD-ROM), a digital versatile disc (DVD) or other optical memories, a magnetic cassette tape, a magnetic tape, a magnetic disk storage or other magnetic storage devices, or any other non-transmission medium, which may be used to store information that can be accessed by a computing device. As defined herein, the computer-readable media do not include transitory media, such as modulated data signals and carriers.

The memory 404 may store therein a plurality of modules or units including:
an acquisition module 410 configured to acquire a migration request 412 for a source database;
a creation module 414 configured to create a snapshot 416 of to-be-migrated data in the source database and migrate the snapshot 416 to a target database;
a reading module 418, configured to read a data migration log 420 stored in a primary replica database of the source database and synchronize the data migration log 420 into the target database; and
a configuration module 422 configured to configure a route for a target primary replica database of the target database according to routing rules 424 of the primary replica database.

For example, the source database includes the primary replica database and at least one secondary replica database; and the target database includes at least two replica databases.

For example, the reading module 418 comprises:
an establishment submodule, configured to establish a log synchronization link based on the primary replica database, the at least one secondary replica database, and the at least two replica databases; and
a synchronization submodule, configured to synchronize the data migration log into the target database according to an upstream-downstream connection relationship of each node in the log synchronization link.

For example, the synchronization submodule comprises:
a first synchronization unit, configured to synchronize the data migration log from the primary replica database into the at least one secondary replica database; and
a second synchronization unit, configured to synchronize the data migration log from the at least one secondary replica database into the at least two replica databases.

For example, the configuration module 422 comprises:
a determination submodule, configured to determine any of the replica databases contained in the target database as the target primary replica database; and
a configuration submodule, configured to configure a route for the target primary replica database according to the routing rules of the primary replica database.

For example, the target primary replica database is determined by:
initiating an election to the source database based on identification information of the at least two replica databases, wherein the election is used to elect the target primary replica database from the at least two replica databases;
acquiring voting results submitted by the primary replica database and the at least one secondary replica database; and
counting the voting results, and determining one of the at least two replica databases first obtaining more votes than a preset threshold as the target primary replica database.

For example, the creation module 414 comprises:
a creation submodule, configured to create a snapshot of full to-be-migrated data in the primary replica database or any secondary replica database of the source database; and
a migration submodule, configured to migrate the snapshot to the target database by a preset migration mode.

For example, the data migration device further comprises:
a judgment module, configured to judge whether the number of synchronized log entries in the data migration log meets a preset threshold; and
determine that a synchronization progress of the data migration log meets a preset progress threshold if the running result of the judgment module is yes, and perform the step of configuring the route for the target primary replica database of the target database according to the routing rules of the primary replica database in the source database.

For example, the device 400 may further comprise the following modules stored in the memory 404:
a receiving module, configured to receive a data read-write request;
a searching module, configured to search a corresponding target primary replica database according to an identifier of requested data in the data read request; and
a performing module, configured to perform a data read-write operation on the target primary replica database according to routing rules for data read-write of the target primary replica database.

The above is a schematic solution of a data migration device according to this embodiment. It should be noted that the technical solution of the data migration device belongs to the same concept as the technical solution of the data migration method described above, and for details that are not described in detail in the technical solution of the data migration device, reference may be made to the description of the technical solution of the data migration method described above.

Figure 5:
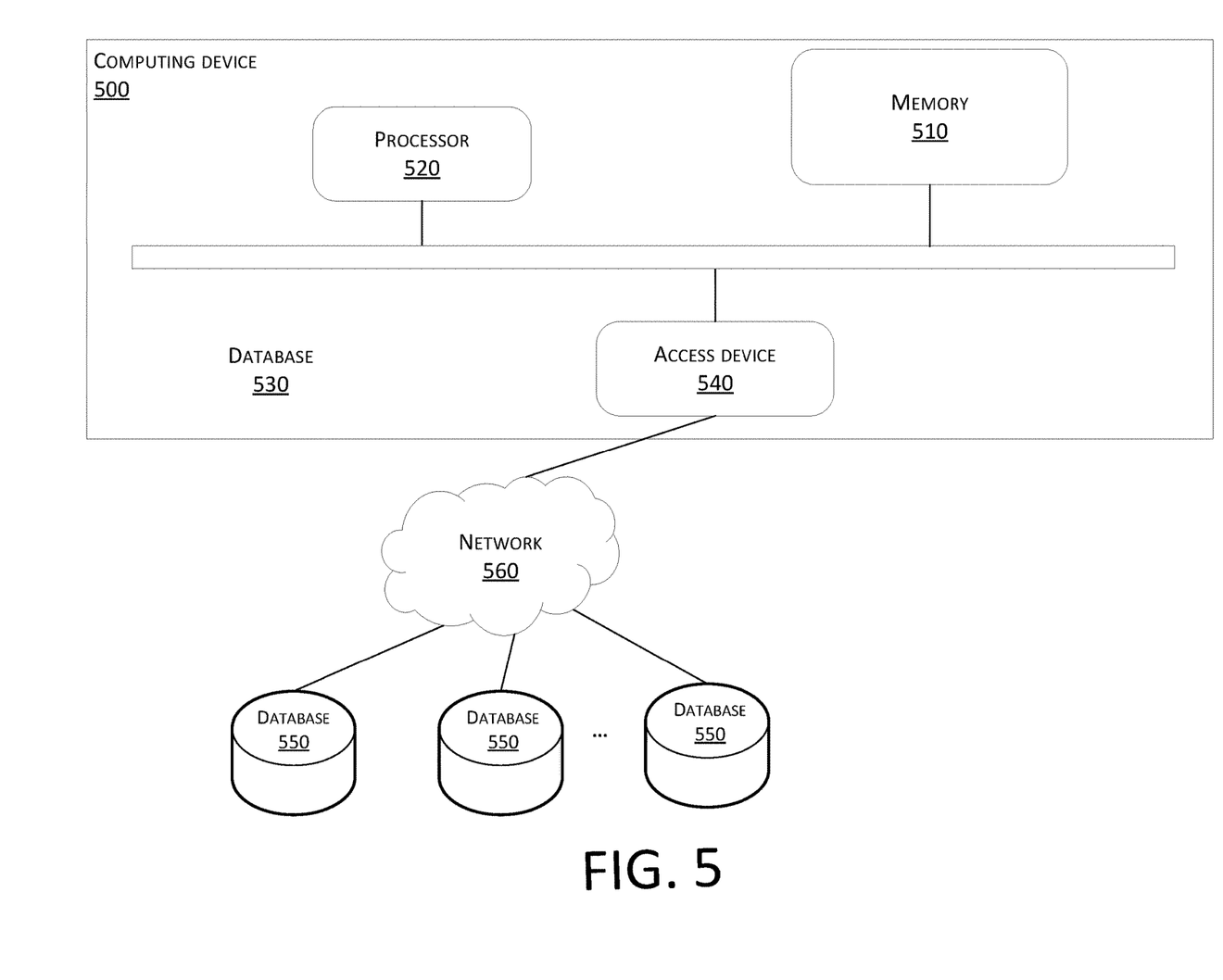
FIG. 5 is a structural block diagram of a computing device according to an embodiment of the present disclosure.

FIG. 5 shows a structural block diagram of a computing device 500 provided according to an embodiment of the present disclosure. Components of the computing device 500 include, but are not limited to, a memory 510 and a processor 520. The processor 520 is connected with the memory 510 through a bus 530, and a database 550 is used for saving data.

The computing device 500 further includes an access device 540, wherein the access device 540 enables the computing device 500 to communicate via one or more networks 560. Examples of such networks include a public switched telephone network (PSTN), a local area network (LAN), a wide area network (WAN), a personal area network (PAN), or a combination of communication networks such as the Internet. The access device 540 may include one or more of any type of wired or wireless network interfaces (e.g., a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In one embodiment of the present disclosure, the above components of the computing device 500 and other components not shown in FIG. 5 may also be connected to each other, such as through a bus. It should be understood that the structural block diagram of the computing device shown in FIG. 5 is only for the purpose of example, rather than limiting the scope of the present disclosure. Other components may be added or replaced as desired by those skilled in the art.

The computing device 500 may be any type of stationary or mobile computing device, including a mobile computer or mobile computing device (e.g., a tablet computer, a personal digital assistant, a laptop computer, a notebook computer, and a netbook), a mobile phone (e.g., a smartphone), a wearable computing device (e.g., a smartwatch and a pair of smart glasses), or other types of mobile devices, or a stationary computing device such as a desktop computer or PC. The computing device 500 may also be a mobile or stationary server.

The memory 510 is configured to store computer-executable instructions, and the processor 520 is configured to execute the computer-executable instructions to:
  acquire a migration request for performing data migration on a source database;
  create a snapshot of the data in the source database and migrate the snapshot to a target database;
  read a data migration log stored in a primary replica database of the source database and synchronize the data migration log into the target database; and
  configure a route for a target primary replica database of the target database according to routing rules of the primary replica database.

The above is a schematic solution of a computing device according to this embodiment. It should be noted that the technical solution of the computing device belongs to the same concept as the technical solution of the data migration method described above, and for details that are not described in detail in the technical solution of the computing device, reference may be made to the description of the technical solution of the data migration method described above.

An embodiment of the present disclosure further provides a computer-readable storage medium having computer instructions stored thereon, which, when executed by a processor, is configured to implement the steps of the data migration method.

The above is a schematic solution of a computer-readable storage medium according to this embodiment. It should be noted that the technical solution of the storage medium belongs to the same concept as the technical solution of the data migration method described above, and for details that are not described in detail in the technical solution of the storage medium, reference may be made to the description of the technical solution of the data migration method described above.

The above describes specific embodiments of the present disclosure. Other embodiments fall within the protection scope of the appended claims. In some cases, the actions or steps stated in the claims may be performed in a sequence different from those in the embodiments and the desired result may still be achieved. In addition, the processes described in the accompanying drawings do not necessarily require the specific order or sequential order shown to achieve the desired result. In some implementation manners, multitasking and parallel processing are also feasible or may be advantageous.

The computer instructions include computer program codes that may be in source code forms, object code forms, executable files, some intermediate form, or the like. The computer-readable medium may include: any entity or device capable of carrying the computer program code, recording medium, USB flash disk, mobile hard disk, magnetic disk, optical disk, computer memory, read-only memory (ROM), random access memory (RAM), electrical carrier signal, telecommunication signal, software distribution medium, and the like. It should be noted that appropriate addition or deletion on the content contained in the computer-readable medium may be made in accordance with the requirements of legislation and patent practice in a jurisdiction, for example, in some jurisdictions, the computer-readable medium may not include electrical carrier signals or telecommunication signals in accordance with legislation and patent practice.

It should be noted that with regard to the above-described method embodiments, in order to provide a simple and concise description, the method embodiments are all expressed as a series of action combinations. Those skilled in the art, however, should know that the present disclosure is not limited by the described sequence of actions as some steps may be executed in another sequence or simultaneously according to the present disclosure. Secondly, those skilled in the art should also know that the embodiments described in the present disclosure are all example embodiments, and the involved actions and modules are not necessarily required by the embodiments of the present disclosure.

In the above embodiments, the description of each embodiment has its own emphasis. For any part that is not described in detail in one embodiment, reference may be made to related descriptions in other embodiments.

The example embodiments of the present disclosure disclosed above are provided only to aid in the description of the present disclosure. Alternative embodiments are not intended to exhaust all details, nor do they limit the present disclosure to only the detailed embodiments described. Apparently, many modifications and changes can be made in accordance with the contents of the embodiments of the present disclosure. These embodiments are selected and described in the present disclosure to better explain the principles and practical applications of the embodiments of the present disclosure, so that those skilled in the art can well understand and utilize the present disclosure. The present disclosure is limited only by the claims and their full scope and equivalents.

The present disclosure may further be understood with clauses as follows.

Clause 1. A data migration method, comprising:
  acquiring a migration request for a source database;
  creating a snapshot of to-be-migrated data in the source database and migrating the snapshot to a target database;
  reading a data migration log stored in a primary replica database of the source database and synchronizing the data migration log into the target database; and configuring a route for a target primary replica database of the target database according to routing rules of the primary replica database.

Clause 2. The data migration method according to clause 1, wherein the source database includes the primary replica database and at least one secondary replica database; and the target database includes at least two replica databases.

Clause 3. The data migration method according to clause 2, wherein the data migration log is synchronized into the target database by:
  establishing a log synchronization link based on the primary replica database, the at least one secondary replica database, and the at least two replica databases; and
  synchronizing the data migration log into the target database according to an upstream-downstream connection relationship of each node in the log synchronization link.

Clause 4. The data migration method according to clause 3, wherein the synchronizing the data migration log into the target database according to an upstream-downstream connection relationship of each node in the log synchronization link comprises:
  synchronizing the data migration log from the primary replica database into the at least one secondary replica database; and
  synchronizing the data migration log from the at least one secondary replica database into the at least two replica databases.

Clause 5. The data migration method according to clause 2, wherein the configuring a route for a target primary replica database of the target database according to routing rules of the primary replica database comprises:
  determining any of the replica databases contained in the target database as the target primary replica database; and
  configuring a route for the target primary replica database according to the routing rules of the primary replica database.

Clause 6. The data migration method according to clause 2, wherein the target primary replica database is determined by:
  initiating an election to the source database based on identification information of the at least two replica databases, wherein the election is used to elect the target primary replica database from the at least two replica databases;
  acquiring voting results submitted by the primary replica database and the at least one secondary replica database; and
  counting the voting results, and determining one of the at least two replica databases first obtaining more votes than a preset threshold as the target primary replica database.

Clause 7. The data migration method according to clause 1, wherein the creating a snapshot of to-be-migrated data in the source database and migrating the snapshot to a target database comprises:
  creating a snapshot of full to-be-migrated data in the primary replica database or any secondary replica database of the source database; and
  migrating the snapshot to the target database by a preset migration mode.

Clause 8. The data migration method according to clause 1, further comprising, after the step of reading a data migration log stored in a primary replica database of the source database and synchronizing the data migration log into the target database is performed and before the step of configuring a route for a target primary replica database of the target database according to routing rules of the primary replica database is performed:
  judging whether the number of synchronized log entries in the data migration log meets a preset threshold; and
  if so, determining that a synchronization progress of the data migration log meets a preset progress threshold, and performing the step of configuring the route for the target primary replica database of the target database according to the routing rules of the primary replica database in the source database.

Clause 9. The data migration method according to clause 1, wherein the method further comprises, after the step of configuring a route for a target primary replica database of the target database according to routing rules of the primary replica database in the source database is performed:
  receiving a data read-write request;
  searching a corresponding target primary replica database according to an identifier of requested data in the data read request; and
  performing a data read-write operation on the target primary replica database according to routing rules for data read-write of the target primary replica database.

Clause 10. A data migration device, comprising:
  an acquisition module, configured to acquire a migration request for a source database;
  a creation module, configured to create a snapshot of to-be-migrated data in the source database and migrate the snapshot to a target database;
  a reading module, configured to read a data migration log stored in a primary replica database of the source database and synchronize the data migration log into the target database; and
  a configuration module, configured to configure a route for a target primary replica database of the target database according to routing rules of the primary replica database.

Clause 11. A computing device, comprising:
  a memory and a processor;
  wherein the memory is configured to store computer-executable instructions, and the processor is configured to execute the computer-executable instructions to:
  acquire a migration request for a source database;
  create a snapshot of to-be-migrated data in the source database and migrate the snapshot to a target database;
  read a data migration log stored in a primary replica database of the source database and synchronize the data migration log into the target database; and
  configure a route for a target primary replica database of the target database according to routing rules of the primary replica database.

Clause 12. A computer-readable storage medium having computer instructions stored thereon, which, when executed by a processor, implement the steps of the data migration method according to any one of clauses 1-9.

What is claimed is:

1. A method for routing in a distributed database system including leader nodes, follower nodes and candidate nodes, the method comprising:
  acquiring a migration request for a source database;
  creating a snapshot of to-be-migrated data in the source database, the source database including a primary replica database and at least one secondary replica database;

migrating the snapshot to a target database by adopting a data mirroring backup tool, the target database including at least two replica databases;

reading a data migration log stored in the primary replica database of the source database, the primary replica database being a leader node;

synchronizing the data migration log into the target database in an incremental synchronization manner;

performing a route switching that switches a route from the source database to the target database during the synchronizing the data migration log in response to determining that a quantitative number of synchronized log entries in the data migration log that has completed synchronization meets a preset number threshold, the performing including:

determining that a difference between log sites of at least one replica database in the target database and log sites of the primary replica database in a source database is less than a preset threshold;

changing a state of the at least one secondary replica database in the source database from active to passive; and changing states of the at least two replica databases in the target database from passive to active;

determining a replica database contained in the target database as a target primary replica database;

configuring a route for the target primary replica database of the target database according to one or more routing rules of the primary replica database; and configuring the target primary replica database as a new leader node.

2. The method according to claim 1, wherein the synchronizing the data migration log into the target database comprises:

establishing a log synchronization link based on the primary replica database, the at least one secondary replica database, and the at least two replica databases; and synchronizing the data migration log into the target database according to an upstream-downstream connection relationship of multiple node in the log synchronization link.

3. The method according to claim 2, wherein the synchronizing the data migration log into the target database according to the upstream-downstream connection relationship of multiple nodes in the log synchronization link comprises:

synchronizing the data migration log from the primary replica database into the at least one secondary replica database; and synchronizing the data migration log from the at least one secondary replica database into the at least two replica databases.

4. The method according to claim 1, further comprising determining the target primary replica database, the determining the target primary replica database including:

initiating an election to the source database based on identification information of the at least two replica databases, wherein the election is used to elect the target primary replica database from the at least two replica databases;

acquiring voting results submitted by the primary replica database and the at least one secondary replica database;

counting the voting results; and determining one of the at least two replica databases that obtains more votes than a preset threshold as the target primary replica database.

5. The method according to claim 4, wherein the determining one of the at least two replica databases that obtains more votes than the preset threshold as the target primary replica database includes:

determining one of the at least two replica databases that firstly obtains more votes than the preset threshold as the target primary replica database.

6. The method according to claim 1, wherein the creating the snapshot of to-be-migrated data in the source database comprises:

creating a snapshot of full to-be-migrated data in the primary replica database or a secondary replica database of the source database.

7. The method according to claim 6, wherein the migrating the snapshot to the target database comprises:

migrating the snapshot to the target database by a preset migration mode.

8. The method according to claim 1, further comprising:

after the synchronizing the data migration log into the target database and before the configuring the route for the target primary replica database of the target database according to the one or more routing rules of the primary replica database, judging whether a quantitative number of synchronized log entries in the data migration log meets the preset number threshold; and in response to judging that the quantitative number of synchronized log entries in the data migration log meets the preset threshold, determining that a synchronization progress of the data migration log meets a preset progress threshold.

9. The method according to claim 1, further comprising:

after the configuring the route for the target primary replica database of the target database according to the one or more routing rules of the primary replica database, receiving a data read-write request;

searching the target primary replica database according to an identifier of requested data in the data read-write request; and performing a data read-write operation on the target primary replica database according to routing rules for data read-write of the target primary replica database.

10. A device comprising:

one or more processors; and one or more memories storing thereon computer-readable instructions that, when executed by the one or more processors, cause the one or more processors to perform acts comprising:

acquiring a migration request for a source database, the source database including a primary replica database and at least one secondary replica database;

creating a snapshot of to-be-migrated data in the source database;

migrating the snapshot to a target database, the target database including at least two replica databases;

reading a data migration log stored in the primary replica database of the source database;

synchronizing the data migration log into the target database in an incremental synchronization manner;

performing a route switching that switches a route from the source database to the target database during the synchronizing the data migration log in response to determining that a number of synchronized log entries in the data migration log that has completed synchronization meets a preset number threshold, the performing including:
    determining that a difference between log sites of at least one replica database in the target database and log sites of the primary replica database in a source database is less than a preset threshold;
    changing a state of the at least one secondary replica database in the source database from active to passive; and
    changing states of the at least two replica databases in the target database from passive to active; and
    configuring a route for a target primary replica database of the target database according to one or more routing rules of the primary replica database.

11. The device according to claim 10, wherein the synchronizing the data migration log into the target database comprises:
    establishing a log synchronization link based on the primary replica database, the at least one secondary replica database, and the at least two replica databases; and
    synchronizing the data migration log into the target database according to an upstream-downstream connection relationship of multiple node in the log synchronization link.

12. The device according to claim 11, wherein the synchronizing the data migration log into the target database according to the upstream-downstream connection relationship of the multiple nodes in the log synchronization link comprises:
    synchronizing the data migration log from the primary replica database into the at least one secondary replica database; and
    synchronizing the data migration log from the at least one secondary replica database into the at least two replica databases.

13. The device according to claim 11, wherein the configuring the route for the target primary replica database of the target database according to the one or more routing rules of the primary replica database comprises:
    determining a replica database contained in the target database as the target primary replica database; and
    configuring a route for the target primary replica database according to the one or more routing rules of the primary replica database.

14. The device according to claim 11, wherein the acts further comprise determining the target primary replica database, the determining the target primary replica database including:
    initiating an election to the source database based on identification information of the at least two replica databases, wherein the election is used to elect the target primary replica database from the at least two replica databases;
    acquiring voting results submitted by the primary replica database and the at least one secondary replica database;
    counting the voting results; and
    determining one of the at least two replica databases that obtains more votes than a preset threshold as the target primary replica database.

15. The device according to claim 10, wherein the acts further comprise: after the synchronizing the data migration log into the target database and before the configuring the route for the target primary replica database of the target database according to the one or more routing rules of the primary replica database,
    judging whether a quantitative number of synchronized log entries in the data migration log meets the preset number threshold; and
    in response to judging that the quantitative number of synchronized log entries in the data migration log meets a preset threshold, determining that a synchronization progress of the data migration log meets a preset progress threshold.

16. One or more computer-readable media storing thereon computer-readable instructions that, when executed by one or more processors, cause the one or more processors to perform acts comprising:
    acquiring a migration request for a source database, the source database including a primary replica database and at least one secondary replica database;
    creating a snapshot of to-be-migrated data in the source database;
    migrating the snapshot to a target database, the target database including at least two replica databases;
    reading a data migration log stored in the primary replica database of the source database;
    synchronizing the data migration log into the target database in an incremental synchronization manner;
    performing a route switching that switches a route from the source database to the target database during the synchronizing the data migration log in response to determining that a quantitative number of synchronized log entries in the data migration log that has completed synchronization meets a preset number threshold, the performing including:
        determining that a difference between log sites of at least one replica database in the target database and log sites of the primary replica database in a source database is less than a preset threshold;
        changing a state of the at least one secondary replica database in the source database from active to passive; and
        changing states of the at least two replica databases in the target database from passive to active; and
        configuring a route for a target primary replica database of the target database according to one or more routing rules of the primary replica database.

17. The one or more computer-readable media according to claim 16, wherein the synchronizing the data migration log into the target database comprises:
    establishing a log synchronization link based on the primary replica database, the at least one secondary replica database, and the at least two replica databases; and
    synchronizing the data migration log into the target database according to an upstream-downstream connection relationship of multiple node in the log synchronization link.

18. The one or more computer-readable media according to claim 17, wherein the synchronizing the data migration log into the target database according to the upstream-downstream connection relationship of multiple nodes in the log synchronization link comprises:
    synchronizing the data migration log from the primary replica database into the at least one secondary replica database; and
    synchronizing the data migration log from the at least one secondary replica database into the at least two replica databases.

19. The one or more computer-readable media according to claim 16, wherein the acts further comprise determining the target primary replica database, the determining the target primary replica database including:
  initiating an election to the source database based on identification information of the at least two replica databases, wherein the election is used to elect the target primary replica database from the at least two replica databases;
  acquiring voting results submitted by the primary replica database and the at least one secondary replica database;
  counting the voting results; and
  determining one of the at least two replica databases that obtains more votes than a preset threshold as the target primary replica database.

20. The one or more computer-readable media according to claim 19, wherein the determining one of the at least two replica databases that obtains more votes than the preset threshold as the target primary replica database includes:
  determining one of the at least two replica databases that firstly obtains more votes than the preset threshold as the target primary replica database.

* * * * *